(12) United States Patent
Kitano (10) Patent No.: US 8,405,254 B2
(45) Date of Patent: Mar. 26, 2013

(54) POWER SUPPLY CIRCUIT FOR STANDBY POWER CONTROL AND POWER SUPPLY SYSTEM IN DAISY CHAIN

(75) Inventor: Mikio Kitano, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 271 days.

(21) Appl. No.: 12/648,121

(22) Filed: Dec. 28, 2009

(65) Prior Publication Data

US 2010/0164285 A1 Jul. 1, 2010

(30) Foreign Application Priority Data

Dec. 26, 2008 (JP) ................................ 2008-332470

(51) Int. Cl.
*H02J 3/00* (2006.01)
(52) U.S. Cl. ........................................ 307/116; 307/130
(58) Field of Classification Search .................. 307/116, 307/130
See application file for complete search history.

(56) References Cited

U.S. PATENT DOCUMENTS

| | | | | |
|---|---|---|---|---|
| 4,163,219 A | * | 7/1979 | Kato et al. ................... 340/12.32 |
| 5,055,703 A | * | 10/1991 | Schornack ...................... 307/64 |
| 5,369,561 A | * | 11/1994 | McCullough ................... 363/37 |
| 5,565,714 A | * | 10/1996 | Cunningham ................. 307/112 |
| 5,995,388 A | * | 11/1999 | Preller ........................ 363/21.15 |
| 6,272,030 B1 | * | 8/2001 | Oomura ........................... 363/62 |
| 6,330,175 B2 | * | 12/2001 | Shirato et al. ................... 363/89 |
| 6,489,725 B1 | * | 12/2002 | Suzuki et al. ................. 315/159 |
| 6,496,390 B2 | * | 12/2002 | Yang ......................... 363/21.07 |
| 7,062,191 B2 | * | 6/2006 | Matsukura ....................... 399/88 |
| 7,243,261 B2 | * | 7/2007 | Yashiro ........................... 714/14 |
| 7,474,146 B2 | * | 1/2009 | Wu .................................. 327/544 |
| 2001/0010639 A1 | * | 8/2001 | Shirato et al. ................... 363/89 |
| 2005/0063725 A1 | * | 3/2005 | Matsukura ....................... 399/88 |
| 2006/0120000 A1 | * | 6/2006 | Fiesoli et al. ................. 361/93.1 |
| 2007/0279951 A1 | * | 12/2007 | Wu .................................. 363/76 |
| 2009/0287946 A1 | * | 11/2009 | Lin ................................ 713/323 |

FOREIGN PATENT DOCUMENTS

JP 2000-197268 A 7/2000

* cited by examiner

*Primary Examiner* — Adi Amrany
(74) *Attorney, Agent, or Firm* — Crowell & Moring LLP (57) ABSTRACT

A power supply circuit includes a slave mode in which a power supply is turned on/off by an external device without any standby power supply and a master mode of turning on/off the power supply circuit in the slave mode. A power relay is provided in the power supply circuit between a power supply and a load circuit. The power supply circuit supplies a drive voltage to the power relay upon reception of a power-on command from an external device. A power supply input terminal receives the drive voltage for driving the power relay.

4 Claims, 5 Drawing Sheets

Prior Art

Prior Art

FIG. 5

POWER SUPPLY CIRCUIT FOR STANDBY POWER CONTROL AND POWER SUPPLY SYSTEM IN DAISY CHAIN

BACKGROUND

This invention relates to a power supply circuit and a power supply system for turning on/off a power supply by an external device or turning on/off a power supply together with a power supply of an external device.

Figure 1A:
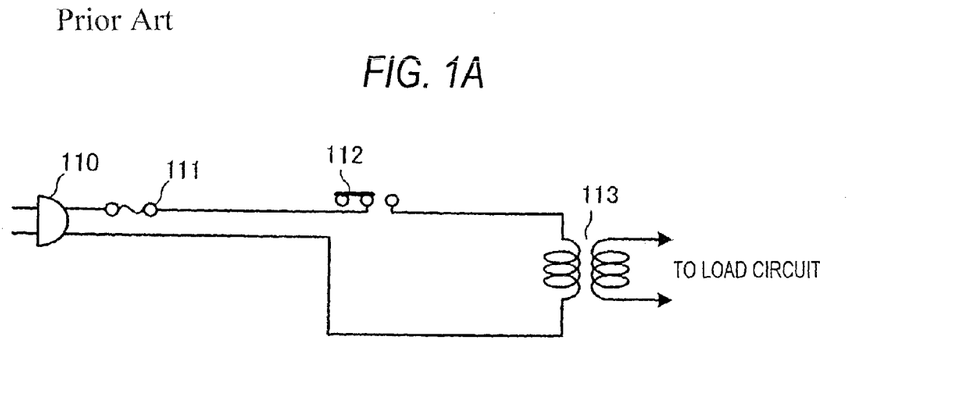
FIGS. 1A and 1B are drawings to show examples of related power supply circuits.
Figure 1B:
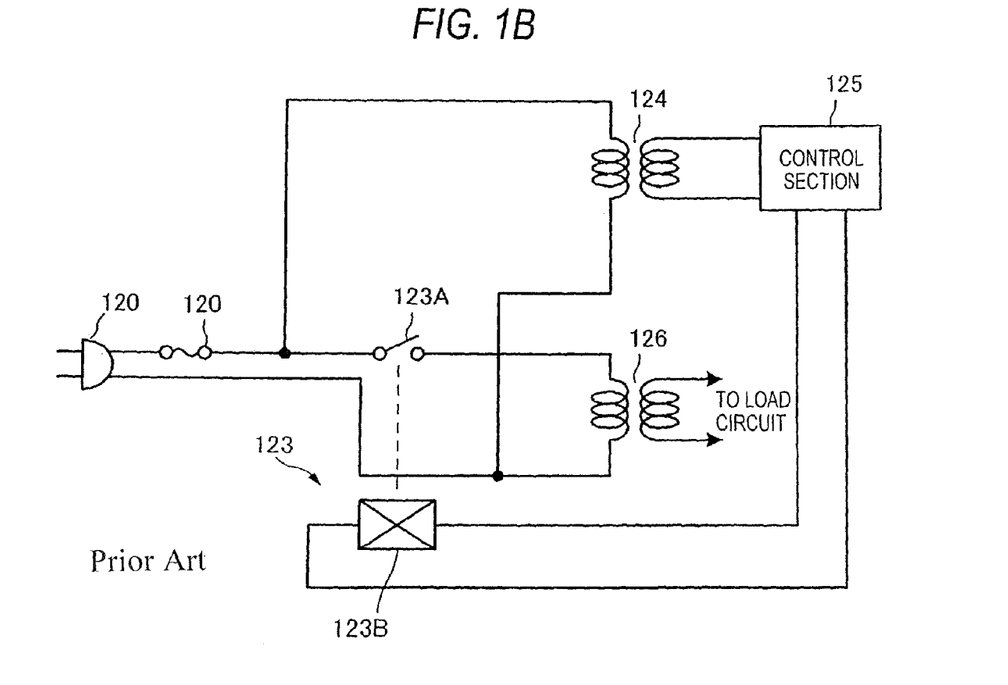

FIGS. 1A and 1B show related power supply circuits. FIG. 1A shows a old circuit configuration. The power supply circuit has a power switch 112 arranged between a power plug 110 and a power transformer (main transformer) 113. In the power supply circuit, a power supply to the primary side of the power transformer 113 is turned on/off by manual operation of the power switch 112.

On the other hand, FIG. 1B shows a configuration described in patent document 1, etc. A power supply can be turned on/off by an external device of an infrared remote control, etc. A relay contact (NO contact) 123A of a power relay 123 is inserted between a power plug 120 and a main transformer 126. A subtransformer 124, a control section 125, and the relay 123 are included as a standby circuit for turning on/off a power supply by operating an external device. The subtransformer is connected directly to the power plug 120 and when the power plug 120 is inserted into a receptacle, the circuit is energized at all times. Therefore, the control section 125 connected to the secondary side of the subtransformer 124 operates at all times and is ready to receive a command from an external device of an infrared remote control, etc. Upon reception of a power on command from an external device, the control section 125 allows an electric current to flow into a relay coil 123B of the relay 123 for turning on the relay contact 123A. Accordingly, an electric current flows into the main transformer 126 and a load circuit connected to the secondary side of the main transformer 126 operates.

[Patent document 1] JP-A-2000-197268

However, a device incorporating the power supply circuit in FIG. 1A cannot be powered on/off by an external device and thus if the user wants to use the device at any desired time, the power switch 112 must remain turned on and power consumption is enormous. Since the control section 125 is turned on at all times by the subtransformer 124, the power supply circuit in FIG. 1B also involves a problem of consumption of standby power.

SUMMARY

It is an object of the invention to provide a power supply circuit including a slave mode in which a power supply is turned on/off by an external device without any standby power supply and a master mode of turning on/off the power supply circuit in the slave mode, and a power supply system having a plurality of power supply circuits as described above connected to each other.

In order to achieve the above object, according to the present invention, there is provided a power supply circuit comprising:

a power relay provided between a power supply and a load circuit;

a control section that supplies a drive voltage to the power relay upon reception of a power-on command from an external device;

a mode selecting switch that turns on/off a connection between the control section and the power supply; and a power supply input terminal that receives the drive voltage for driving the power relay from the outside.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

Embodiments of the invention will be discussed with reference to the accompanying drawings.

Figure 2:
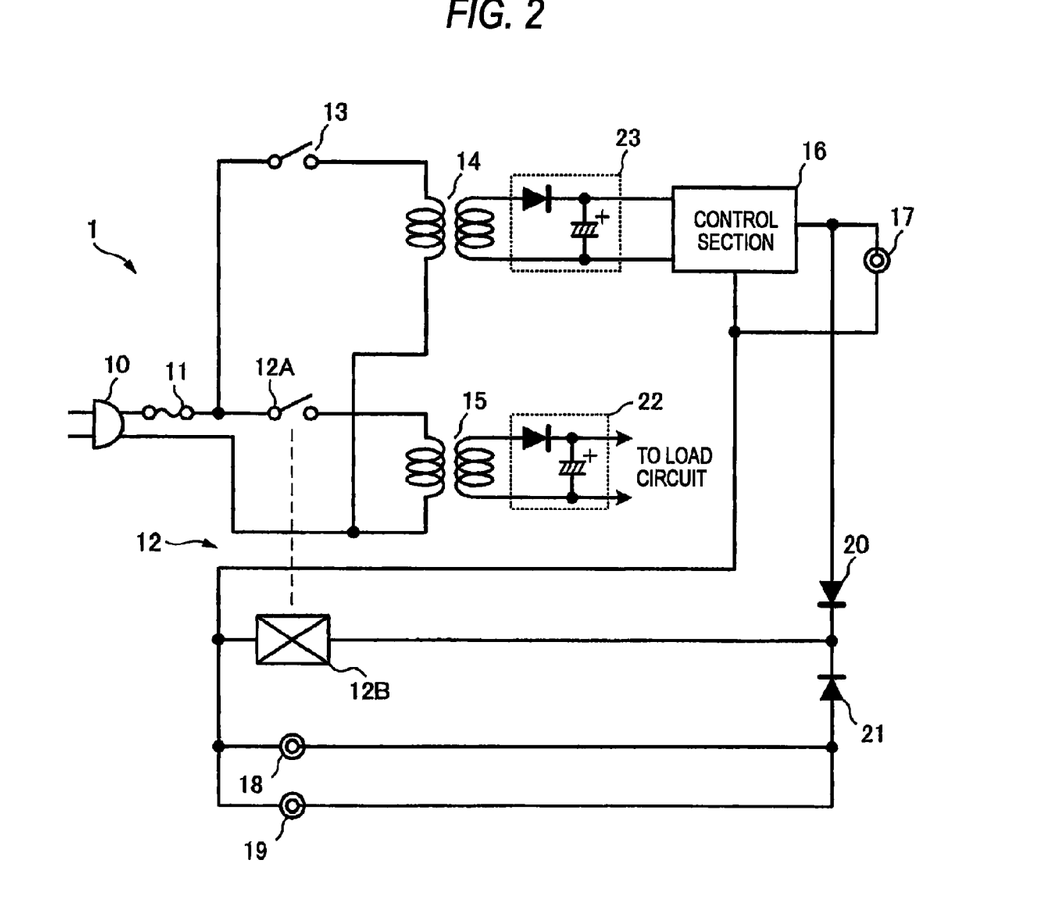
FIG. 2 is a drawing to show the configuration of a power supply circuit of an embodiment of the invention.

FIG. 2 is a drawing to show a power supply circuit of an embodiment of the invention. This power supply circuit is a power supply circuit incorporated in each of electronic devices of components used as a combination of devices of an audio amplifier, an FM tuner, a DVD player, etc., for example.

The power supply circuit includes a plug 10 for receiving a commercial power supply from a power receptacle. One side (hot side) of the plug 10 is connected to a main transformer 15 through a fuse 11 and a primary relay 12 of a power relay (relay contact 12A) and is also connected to a subtransformer 14 through the fuse 11 and a mode selecting switch 13. The other side (ground side) of the plug 10 is connected directly to the main transformer 15 and the subtransformer 14.

The primary relay 12 has a relay contact 12A and a relay coil 12B. The relay contact 12A is a normally open contact. The relay contact 12A is turned off (open) when no current flows into the relay coil 12B. The relay contact 12A is turned on (closed) only when a current flows into the relay coil 12B. The primary relay 12 (relay contact 12A) is turned on, whereby commercial power is supplied to the main transformer 15 and the power is supplied to a load circuit connected to the secondary side of the main transformer 15 through a rectifying circuit 22.

The mode selecting switch 13 is a switch for switching a master mode and a slave mode. The master mode is a mode for turning on/off the power supply (primary relay 12) according to an externally input power on command and further turning on/off any other power supply circuit as well, and the slave mode is a mode in which power on/off is controlled according to a relay drive voltage supplied from any other power supply circuit. When the mode selecting switch 13 is turned on, the master mode is entered; when the mode selecting switch 13 is turned off, the slave mode is entered.

In the master mode, the subtransformer 14 is energized at all times and a control section 16 connected to the secondary side of the subtransformer 14 through a rectifying circuit 23 always operates. In the slave mode, no current flows into the subtransformer 14 and thus the control section 16 does not operate.

The control section 16 has a relay drive power supply circuit for driving the primary relay, a remote control light reception section for receiving various commands including a power on/off command, etc., from an infrared remote control, and the like. Upon reception of a power on command from the infrared remote control, the control section 16 operates the relay drive power supply circuit to generate a relay drive voltage. The relay drive power supply circuit is a circuit having a current capacity for driving a plurality of primary relays at the same time. A voltage output terminal of the control section 16 is connected to the relay coil 12B and is also connected to a trigger output terminal (Power Trigger Out) 17. The control section 16 supplies a relay drive voltage to the primary relay 12, which then is turned on, closing the relay contact 12A.

A trigger input terminal (Power Trigger In) 18 and a trigger through terminal (Power Trigger Through) 19 are connected to the relay coil 12B in parallel. The trigger input terminal 18 is a terminal for inputting a relay drive voltage from a different power supply circuit, and the trigger through terminal 19 is a terminal for outputting the relay drive voltage input from the trigger input terminal 18 to another different power supply circuit. If the relay drive voltage is supplied from the trigger input terminal 18, the primary relay 12 is turned on, closing the relay contact 12A as with the case where the relay drive voltage is supplied from the internal control section 16.

The control section 16 receives a command for controlling a load circuit as well as the power on/off command. Upon reception of such a command, the control section 16 performs control corresponding to the command for the load circuit. The control section 16 also monitors the operation of a device (particularly, load circuit); when an anomaly (for example, an overcurrent, abnormal temperature rise, etc.,) occurs in the operation, the control section 16 stops supplying the relay drive voltage to the relay coil 12B and stops the abnormal operation.

A diode 20 is inserted into the path from a positive terminal of the control section 16 to a positive terminal of the relay coil 12B, and a diode 21 is inserted into the path from a positive terminal of the trigger input terminal 18 to the positive terminal of the relay coil 12B. The diode 20 prevents the relay drive voltage input from the trigger input terminal 18 from being routed to the control section 16. The diode 21 prevents the relay drive voltage output by the control section 16 from being routed to the trigger input terminal 18.

An electronic device incorporating the power supply circuit of the embodiment is used in combination with a different electronic device, as described above. At least one of the electronic devices used in combination operates as a master and any other device operates as a slave.

Figure 3:
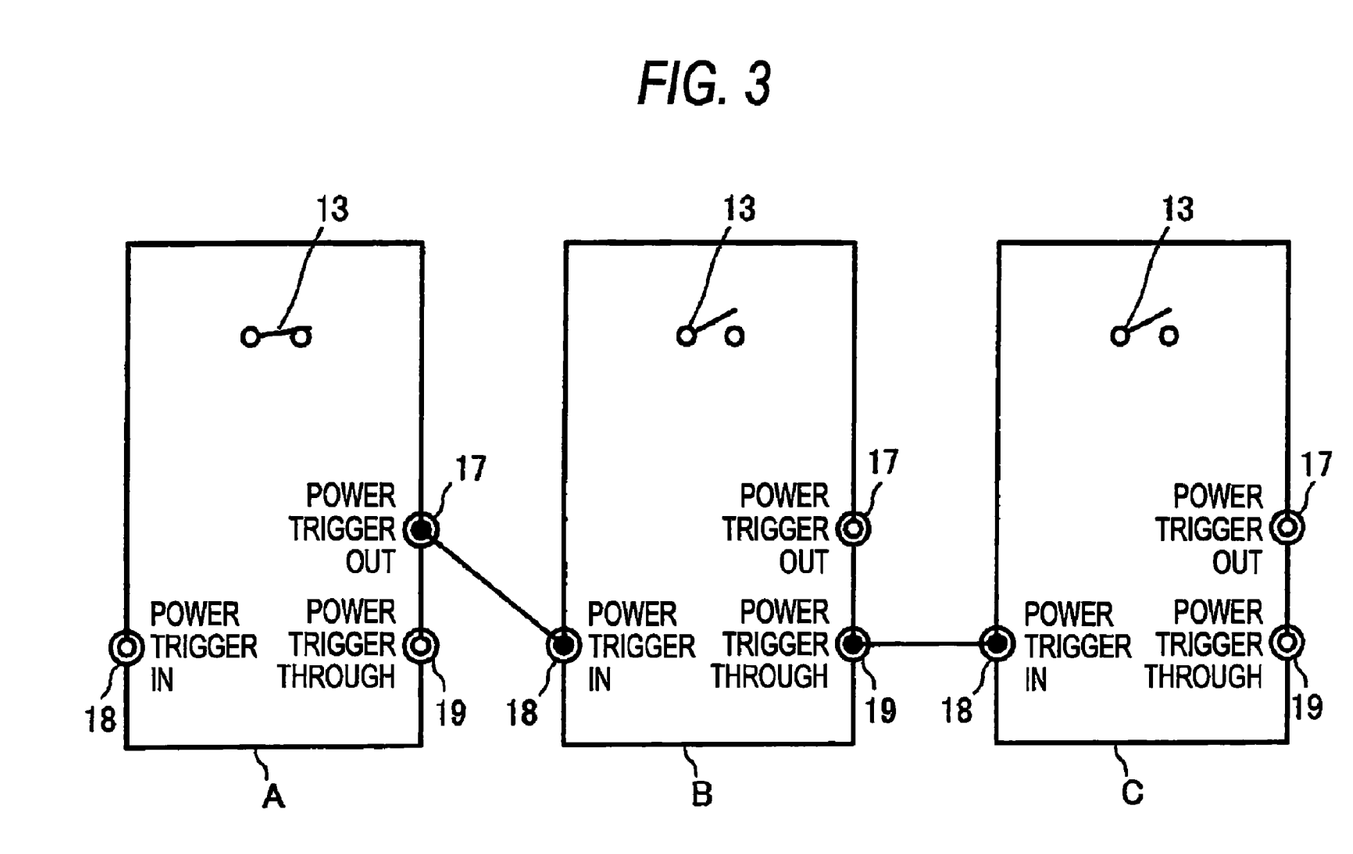
FIG. 3 is a drawing to show the configuration of a system containing electronic devices each incorporating the power supply circuit of the embodiment of the invention.

FIG. 3 is a drawing to show an example of an electronic device system in which electronic devices A, B, and C each incorporating the power supply circuit shown in FIG. 2 are connected. The electronic device A has the mode selecting switch 13 turned on and operates as the master. Each of other electronic devices B and C has the mode selecting switch 13 turned off and operates as the slave. The trigger output terminal (Power Trigger Out) 17 of the electronic device A of the master is connected to the trigger input terminal (Power Trigger In) 18 of the electronic device B of the slave, and the trigger through terminal (Power Trigger Through) 19 of the electronic device B is connected to the trigger input terminal (Power Trigger In) 18 of the electronic device C of another slave.

In this connection mode, when a power on command is input to the control section 16 of the electronic device A, the control section 16 starts the relay drive power supply circuit to generate a relay drive voltage. The drive voltage is supplied to the relay coil 12B of the home device (electronic device A) for turning on the power of the electronic device A (load circuit), and is output to the outside through the trigger output terminal 17. The relay drive voltage output to the outside is input to the trigger input terminal 18 of the electronic device B and further is again output from the trigger through terminal 19 of the electronic device B and is input to the trigger input terminal 18 of the electronic device C.

In the electronic device B, the relay drive voltage input to the trigger input terminal 18 is supplied to the relay coil 12B for turning on the power of the electronic device C (load circuit).

In the embodiment in FIG. 3, two slave devices are connected to one master device, but the number of slave devices is not limited to two. In FIG. 3, the downstream slave device is connected to the trigger through terminal of the upstream slave device as daisy chain connection, but a plurality of slave devices may be connected directly (in parallel) to the master device. In this case, the master device may be provided with a plurality of trigger output terminals 17 or wiring from the trigger output terminal 17 may be branched.

Figure 4:
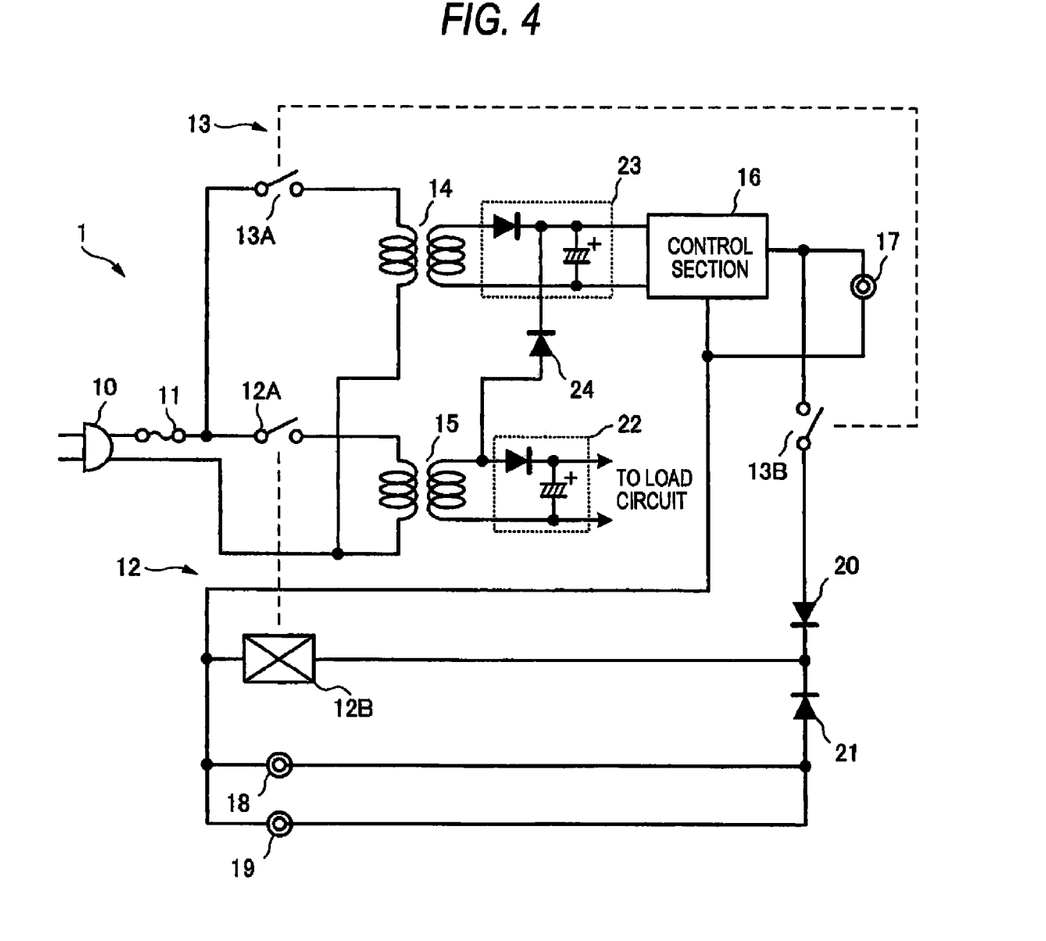
FIG. 4 is a drawing to show the configuration of a power supply circuit of another embodiment of the invention.

FIG. 4 is a configuration drawing of a power supply circuit provided by adding a path for supplying power from the main transformer 15 to the control section 16 to the power supply circuit in FIG. 2. Parts identical with those of the power supply circuit in FIG. 2 are denoted by the same reference numerals in FIG. 4 and will not be discussed again.

In the power supply circuit in FIG. 4, the hot side of a main transformer 15 and the hot side of a subtransformer 14 are connected through a diode 24. The diode 24 is forward connected from the main transformer 15 to the subtransformer 14. A mode selecting switch 13 is a dual switch made up of two switches operatively connected to each other; one is a switch 13A inserted between a plug 10 and the subtransformer 14 as in the power supply circuit in FIG. 2 and the other is a switch 13B inserted between the control section 16 and a diode 20 (relay coil 12B). That is, when a slave mode is selected by switching of the mode selecting switch 13, the path between the plug 10 and the subtransformer 14 is shut off and the path between the control section 16 and the relay coil 12B is also shut off.

Also in the configuration, like the configuration in FIG. 2, no current flows into the subtransformer 14 during the slave mode and thus the control section 16 does not operate at all times. However, as a relay drive voltage of the master device is input from a trigger input terminal 18, when the main transformer 15 is energized, power is supplied to the control section 16 through the diode 24 and the control section 16 is also turned on concurrently with turning on a load circuit. Accordingly, even in the slave mode, when the main transformer 15 is energized and the device operates, it is made possible to receive a command (for example, such as a volume control command) by the control section 16. Also in this case, since the switch 13B is off, the relay drive voltage output by the control section 16 is not supplied to the relay coil 12B and thus when the relay drive voltage from an external device stops, the power of the device is also turned off and the device operates as a slave device.

The control section 16 is turned on, whereby relay drive voltage appears in a trigger output terminal 17 of the slave device, so that daisy chain connection of connecting the trigger output terminal 17 of the upstream slave device to the a trigger input terminal 18 of the downstream slave device is made possible. In this case, a trigger through terminal 19 is not required.

Figure 5:
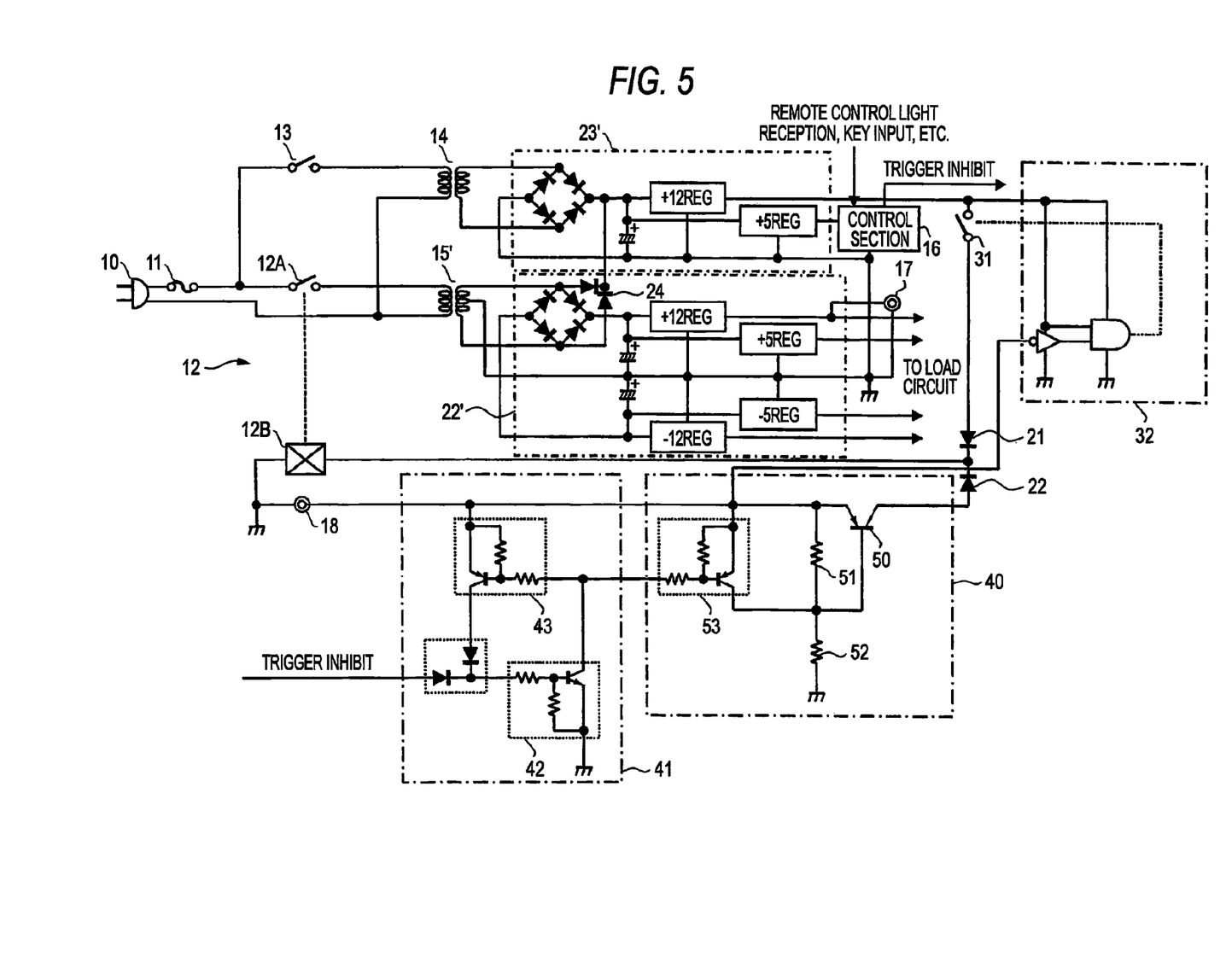
FIG. 5 is a drawing to show the configuration of a power supply circuit of still another embodiment of the invention.

FIG. 5 is a drawing to show another embodiment of a power supply circuit of the invention. Parts identical with those of the power supply circuit in FIG. 2 are denoted by the same reference numerals in FIG. 5 and will not be discussed again. A main transformer 15' has a secondary coil with an intermediate tap, and a rectifying circuit 22' has a diode bridge for full wave rectification and ±12V and ±5 V constant voltage regulators; the basic operation is similar to that of the main transformer 15 and the rectifying circuit 22 shown in FIG. 2. A rectifying circuit 23' connected to a subtransformer 14 also has a diode bridge for full wave rectification and ±12V and ±5 V constant voltage regulators; the basic operation is similar to that of the rectifying circuit 23 shown in FIG. 2.

Differences of the power supply circuit in FIG. 5 from the power supply circuit shown in FIG. 2 will be discussed below:

The hot side of the main transformer 15' and the hot side of the rectifying circuit 23' of the subtransformer 14 are connected through a diode 24 (24A, 24B). The diode 24 is forward connected from the main transformer 15' to the subtransformer 14.

According to the configuration, like the configuration in FIG. 2, no current flows into the subtransformer 14 during a slave mode and thus a control section 16 does not operate at all times. However, as a relay drive voltage is input from a master device, when the main transformer 15' is energized, power is supplied to the control section 16 through the diode 24 and the control section 16 is also turned on concurrently with turning on a load circuit. Accordingly, even in the slave mode, when the main transformer 15' is energized and the device operates, it is made possible to receive a command (for example, such as a volume control command) by the control section 16.

A trigger switch 31 is provided between the control section 16 and a diode 21 (relay coil 12B) and a trigger switch control circuit 32 for turning on the trigger switch 31 when power is fed into the main transformer 15' and no relay drive voltage is input from a trigger input terminal 18 is provided.

If a relay drive voltage is supplied from a different device during the slave mode and the main transformer 15' is turned on, the control section 16 is turned on by connection of the diode 24, but the trigger switch 31 is not turned on by the operation of the trigger switch control circuit 32 because relay drive voltage is input from the trigger input terminal 18 in the slave mode. Accordingly, no relay drive voltage is supplied from the control section 16 to the relay coil 12B and thus when the relay drive voltage from an external device stops, the power of the device is also turned off and the device operates as a slave device.

A trigger output terminal 17 is provided on the secondary side of the main transformer 15'. Since the current capacity of the main transformer 15', the rectifying circuit 22' is larger than the current capacity of the subtransformer 14', the rectifying circuit 23' and thus the configuration is adopted, whereby a sufficient relay drive voltage can be supplied if a plurality of slave devices are connected downstream in parallel.

The control section 16 monitors the operation of the device containing the load circuit and when finding an anomaly, stops outputting the relay drive voltage and also outputs a trigger inhibition signal (Trigger Inhibit). An external trigger switch circuit 40 is inserted between the trigger input terminal 18 and diode 21 (relay coil 12B) and an external trigger control circuit 41 for turning off the external trigger switch circuit 40 and holding the off state when the trigger inhibition signal is input is provided. The external trigger switch circuit 40 and the external trigger control circuit 41 correspond to an external trigger control section of the invention.

The external trigger switch circuit 40 has a switching transistor 50 of a pnp transistor having an emitter connected to the trigger input terminal 18 and a collector connected to the diode 22', resistors 51 and 52 for dividing the potential of the trigger input terminal 18 and supplying the divided potential to a base of the transistor 50, and a switch circuit 53 connected to the resistor 51 in parallel. The switch circuit 53 has a pnp transistor with a bias resister connected between a base and an emitter and a potential dividing resistor connected to the base terminal; when the base potential lowers, the switch circuit is turned on, short-circuiting the resistor 51.

The external trigger control circuit 41 has a switch circuit 42 turned on upon reception of a trigger inhibition signal and a second switch circuit 43 turned on as the switch circuit 42 is turned on for holding the switch circuit 42 on. The switch circuit 42 has an npn transistor with a bias resister connected between a base and an emitter and a potential dividing resistor connected to the base terminal; when the base potential rises, continuity occurs between a collector and the emitter. The second switch circuit 43 has a pnp transistor with a bias resister connected between a base and an emitter and a potential dividing resistor connected to the base terminal; when the base potential lowers, the second switch circuit is turned on and applies the potential of the trigger input terminal 18 to the potential dividing resistor of the switch circuit 42.

A trigger inhibition signal terminal of the control section 16 and the collector of the switch circuit 43 are connected to the base of the switch circuit 42. The npn transistor of the switch circuit 42 has the emitter grounded and the collector connected to the bases of the switch circuit 53 and the switch circuit 43 in common.

Since the switch circuit 42 is off in the initial state, each of the switch circuits 43 and 53 is at the same potential between the base and the emitter and is off. At this time, if a relay drive voltage is supplied from the trigger input terminal 18, the potential divided by the potential dividing resistors 51 and 52 is applied to the base of the switching transistor 50 of the external trigger switch 40 and the switch (transistor) is turned on and the relay drive voltage of the trigger input terminal 18 is supplied through the diode 22 to the relay coil 12B.

In this state, if the control section 16 generates a trigger inhibition signal, the trigger inhibition signal is applied to the base of the switch circuit 42, turning on the switch circuit 42. When the switch circuit 42 is turned on, the base of the pnp transistor of each of the switch circuits 43 and 53 is grounded through the potential dividing resistor and the base potential becomes lower than the emitter potential and thus the switch is turned on.

As the switch circuit 53 is turned on, the potential dividing resistor 51 is short-circuited and the base potential of the switching transistor 50 becomes almost the same potential as the emitter potential and thus the switching transistor 50 is turned off, the relay drive voltage of the trigger input terminal 18 is not supplied to the relay coil 12B, the relay contact 12A is opened, and the main transformer 15' and the load circuit are turned off.

When the switch circuit 43 is turned on, the relay drive voltage of the trigger input terminal 18 is applied to the base of the pnp transistor of the switch circuit 42 through the switch circuit 43—the potential dividing resistor and thus the switch circuit 42 is held on. Accordingly, once the trigger inhibition signal of the control section 16 occurs, if the trigger inhibition signal later stops, the switch circuits 42, 43, and 53 are held on so long as the relay drive voltage is supplied to the trigger input terminal 18, and no relay drive voltage is supplied to the relay coil 12B and the load circuit is not turned on.

When supply of the relay drive voltage is stopped, the state of each of the external trigger switch 40 and the external trigger control circuit 41 is restored to the initial state.

The trigger switch 31 and the trigger switch control circuit 32 may be a manual switch operatively associated with a mode selecting switch 13. In this case, it is necessary to reliably isolate the commercial voltage of 100 VAC and the secondary voltage of 12 VDC.

In the embodiment, the control section 16 detects an overcurrent, abnormal temperature rise, etc., of the load circuit and generates a trigger inhibition signal, but may generate a trigger inhibition signal based on any other cause (for example, command input, etc.,).

Here, the details of the above embodiments are summarized as follows.

According to the present invention, there is provided a power supply circuit comprising:

a power relay provided between a power supply and a load circuit;

a control section that supplies a drive voltage to the power relay upon reception of a power-on command from an external device;

a mode selecting switch that turns on/off a connection between the control section and the power supply; and a power supply input terminal that receives the drive voltage for driving the power relay from the outside.

In the power supply circuit of the invention, when the mode selecting switch is turned on, the control section operates and generates the drive voltage in response to the power-on command from the external device. The drive voltage turns on the power relay of the home device and is output from the power supply output terminal to the outside. This operation mode is called master mode.

When the mode selecting switch is turned off, the control section does not operate and it becomes impossible to turn on the power relay by the home device. This operation mode is called slave mode. To the power supply input terminal of the power supply circuit in the slave mode, the power supply output terminal of any other power supply circuit in the master mode is connected. Accordingly, the power supply circuit in the master mode (master power supply circuit) is turned on, namely, when the control section generates the relay drive voltage, the drive voltage drives the power relay of the power supply circuit in the slave mode (slave power supply circuit) through the power supply output terminal and the power supply input terminal. Accordingly, a plurality of power supply circuits including the master power supply circuit can be turned on by the control section only of the master power supply circuit. In the invention, only turning on the power is mentioned, but the same comment also applies to turning off the power.

Preferably, the power supply circuit further includes a power supply output terminal that outputs the drive voltage to the outside.

Preferably, the power supply circuit further includes a through terminal that outputs the drive voltage received from the power supply input terminal to the outside, the through terminal provided in parallel with the power supply input terminal.

The through terminal allows the voltage input from the power supply input terminal to be output to the outside. To the through terminal of the slave power supply circuit in which the relay drive voltage is input to the power supply input terminal, the power supply input terminal of a different slave power supply circuit is connected, whereby the different slave power supply circuit can be caused to perform the same operation as it is connected directly to the master power supply circuit. Accordingly, a daisy connection of the power supply circuits is made possible.

Preferably, when the mode selecting switch turns on the connection between the control section and the power supply, the control section is enabled as a master mode so as to accept the power-on command from the external device. When the mode selecting switch turns off the connection between the control section and the power supply, the control section is disabled as a slave mode.

The power supply circuit further includes an external trigger control section provided between the power supply input terminal and the power relay. When the power supply input terminal receives the drive voltage from the outside and a predetermined condition is satisfied, the control section outputs a trigger inhibition signal to the external trigger control section. When the external trigger control section receives the trigger inhibition signal, the external trigger control section shuts off an electric connection between the power supply input terminal and the power relay.

Preferably, when the control section detects an overcurrent or an abnormal temperature rise occurring in the load circuit, the predetermined condition is satisfied.

According to this configuration, even in the device operating in the slave mode, if an anomaly occurs in the operation of the device, etc., the power can be turned off by the function of the control section of the home device independently of the function of the master device.

Preferably, the power supply circuit further includes an electric wire that connects the control section to a contact between the load circuit and the relay and other power relay provided between the control section and the power relay. The other power relay is operated so as to work with an operation of the power replay.

According to the present invention, there is also provided a power supply system, comprising:

a first power supply circuit including:
  a power relay provided between a power supply and a load circuit;
  a control section that supplies a drive voltage to the power relay upon reception of a power-on command from an external device;
  a mode selecting switch that turns on/off a connection between the control section and the power supply, wherein the mode selecting switch is turned on for setting the first power supply circuit as a master mode;
  a power supply input terminal that receives the drive voltage for driving the power relay from the outside; and
  a power supply output terminal that outputs the drive voltage to the outside; and
the above described power supply circuit,
wherein the mode selecting switch of the power supply circuit is turned off for setting the power supply circuit as a slave mode; and
wherein the power supply output terminal of the first power supply circuit is electrically connected to the power supply input terminal of the power supply circuit.

Preferably, the power supply system further comprising:
a second power supply circuit including:
  a power relay provided between a power supply and a load circuit;
  a control section that supplies a drive voltage to the power relay upon reception of a power-on command from an external device;
  a mode selecting switch that turns on/off a connection between the control section and the power supply, wherein the mode selecting switch is turned off for setting the second power supply circuit as the slave mode; and a power supply input terminal that receives the drive voltage for driving the power relay from the outside, wherein the power supply circuit further includes a through terminal that outputs the drive voltage received from the power supply input terminal of the first power supply circuit to the power supply input terminal of the second power supply circuit, the through terminal provided in parallel with the power supply input terminal of the power supply circuit.

The power supply circuit of the invention can switch between the master mode in which the control section operates and generates the drive voltage and the slave mode in which the drive voltage is supplied from the outside through the power supply input terminal, so that a plurality of power supply circuits are combined in the master mode and the slave mode, whereby it is made possible for one control section to turn on/off a plurality of power supply circuits in operative association with each other.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2008-332470 filed on Dec. 26, 2008, the contents of which are incorporated herein for reference.

What is claimed is:

1. A power supply system, comprising:
a first power supply circuit including:
    a power relay provided between a power supply and a load circuit;
    a control section that supplies a drive voltage to the power relay upon reception of a power-on command from an external device;
    a mode selecting switch that turns on/off a connection between the control section and the power supply, wherein the mode selecting switch is turned on for setting the first power supply circuit as a master mode;
    a power supply input terminal that receives the drive voltage for driving the power relay from an independent power supply circuit separated from the power supply; and
    a power supply output terminal that outputs the drive voltage to the independent power supply circuit; and
a second power supply circuit including;
    a power relay provided between a power supply and a load circuit;
    a control section that supplies a drive voltage to the power relay upon reception of a power-on command from an external device;
    a mode selecting switch that turns on/off a connection between the control section and the power supply; and
    a power supply input terminal that receives the drive voltage for driving the power relay from the independent power supply circuit,
wherein the mode selecting switch of the second power supply circuit is turned off for setting the second power supply circuit as a slave mode; and wherein the power supply output terminal of the first power supply circuit is electrically connected to the power supply input terminal of the second power supply circuit.

2. The power supply system according to claim 1, further comprising:
a third power supply circuit including:
    a power relay provided between a power supply and a load circuit;
    a control section that supplies a drive voltage to the power relay upon reception of a power-on command from an external device;
    a mode selecting switch that turns on/off a connection between the control section and the power supply, wherein the mode selecting switch is turned off for setting the third power supply circuit as the slave mode; and
    a power supply input terminal that receives the drive voltage for driving the power relay from the independent power supply circuit,
wherein the second power supply circuit further includes a through terminal that outputs the drive voltage received from the power supply input terminal of the first power supply circuit to the power supply input terminal of the third power supply circuit, the through terminal provided in parallel with the power supply input terminal of the second power supply circuit.

3. A power supply circuit, comprising:
a power relay provided between a power supply and a load circuit;
a control section that supplies a drive voltage to the power relay upon reception of a power-on command from an external device;
a mode selecting switch that turns on/off a connection between the control section and the power supply;
a power supply input terminal that receives the drive voltage for driving the power relay from an independent power supply circuit separated from the power supply; and
a through terminal that outputs the drive voltage received from the power supply input terminal to an independent power supply circuit separated from the power supply, the through terminal provided in parallel with the power supply input terminal,
a first diode disposed between a positive terminal of the control section and a positive terminal of the relay coil;
a second diode disposed between a positive terminal of the trigger power supply input terminal and the positive terminal of the relay coil;
wherein the power supply input terminal and the through terminal are connected in parallel to each other and to a relay coil of the power relay.

4. The power supply circuit according to claim 3,
wherein the power supply input terminal inputs a relay drive voltage from a first different power supply circuit, and the through terminal outputs the relay drive voltage input from the power supply input terminal to a second different power supply circuit; and
wherein the first diode prevents the relay drive voltage input from the power supply input terminal from being routed to the control section, and the second diode prevents the relay drive voltage output by the control section from being routed to the power supply input terminal.

* * * * *